Jan. 30, 1962

H. D. SQUIRE 3,018,685

SHEET METAL NUT HAVING DEPRESSED OVAL
OPENING PROVIDING THREAD MEANS

Filed April 9, 1958

INVENTOR.
HERBERT D. SQUIRE
BY
*J. D. Douglas*
*his atty.*

United States Patent Office 3,018,685
Patented Jan. 30, 1962

3,018,685
SHEET METAL NUT HAVING DEPRESSED OVAL OPENING PROVIDING THREAD MEANS
Herbert D. Squire, Galesburg, Ill., assignor to Admiral Corporation, Chicago, Ill., a corporation of Delaware
Filed Apr. 9, 1958, Ser. No. 727,476
3 Claims. (Cl. 85—36)

This invention relates to improvements in threadless fasteners.

It has been common, in the prior art, to provide fasteners or as sometimes called threadless nuts, for cooperation with screws, sometimes called self-tapping screws, for holding various parts together. In particular it has become common practice to incorporate such a nut in a part which may be used to perform a function other than merely holding parts together or where the part having the threadless nut performs the function of holding two parts together and some other function such as a spring clip for engagement with some other part. In either event there are usually two principal classes of such devices, those having spring tongues for engagement with a screw and wherein the screw may be pushed into position, the spring teeth ratcheting over the threads, as shown in the Tinnerman Patent 1,971,881, and the other type where the metal defining the opening is more rigid and is formed at its edges to provide the proper slant or pitch for engagement with the thread and wherein the screw is attached by a rotating motion, the same as in an ordinary screw and nut, as shown in the patent to Kost 2,169,182. The present invention comprises an improvement in the latter type of device. Examples of such devices include the patents to Place 2,172,258 and Lombard 2,115,312.

In the prior devices, it has always been considered necessary to provide some sort of a slit or notch extending from the metal defining the screw engaging opening into the body of the fastener in order that the metal could be deformed to provide places where the thread engaging portion could start and cease engagement with the threads of the screw. The provision of this slit makes the tools for making the fastener expensive, and, when the fastener performed other functions than merely holding two parts together, the slitted type of thread engaging portion made the manufacture much more complicated and increased the cost considerably because of the necessity for performing multiple operations.

By the present invention I have provided a fastener where the screw engaging portion is exceedingly simple in its formation and wherein the cost of tooling to manufacture the same is much cheaper and where, when the fastener is included in a multiple function device, the cost in tools and operations to form the devices is materially decreased over those of the prior art.

The savings in construction are realized largely because I have been able to eliminate the notches or slits. This has increased the strength of the fastener instead of weakening it, as the prior slits did, enabling thinner material to be used when desired. It also enabled the threadless feature to be embodied in heavier materials when desired, whereas in the prior devices there was a definite limit to the thickness of the material that could be used.

Still other advantages of the invention and the invention itself will become more apparent from the following description of an embodiment thereof, which description is illustrated by the accompanying drawing and forms a part of the invention.

Figure 4:
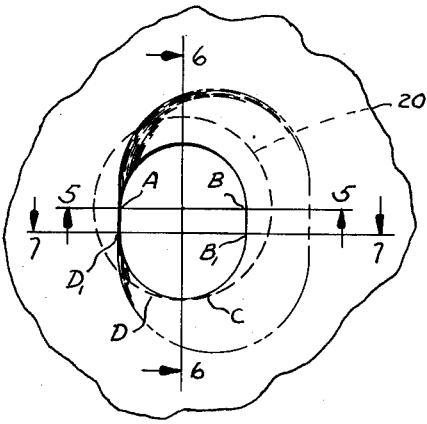
Figure 5:
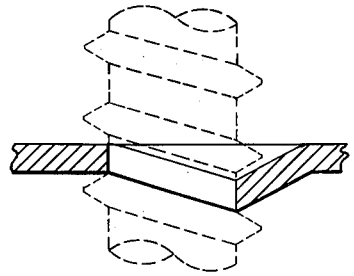
Figure 6:
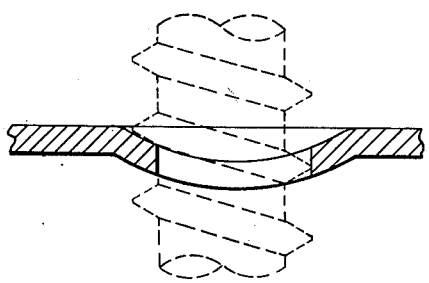
Figure 7:
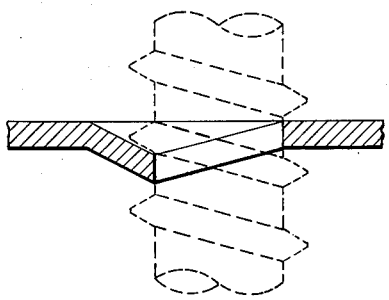

FIG. 4 is a fragmentary enlarged view illustrating the form taken by the fastener of my invention; and FIGS. 5, 6 and 7 are sections taken on the lines 5—5, 6—6 and 7—7 respectively of FIG. 4 and illustrating by dashed lines the manner of cooperation of the screw thread with the edges of the opening.

Figure 1:
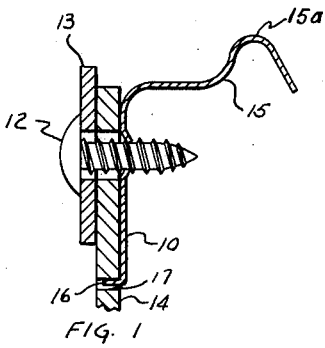
FIG. 1 is a sectional view of a spring catch incorporating therein the fastener of my invention mounted on a support.

In the drawings, FIG. 1 illustrates the fastener of my invention performing a dual function. As can be seen the fastener includes a substantially flat body portion 10 having a screw receiving opening 11, the body acting as a threadless nut for receiving the screw 12 for holding two parts 13 and 14 together. It will be appreciated that the structure comprising the base or body portion 10 may be used alone for the purpose of holding two parts together but that I have chosen to show a catch portion 15 which is formed to provide a boss 15a for releasable holding engagement with another part not shown. In this instance, the body portion is held against turning by a tab 16 extending into a hole 17 in the part 14.

Figure 3:
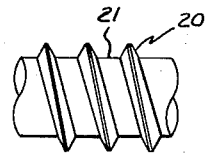
FIG. 3 is an enlarged view of one form of screw that may be used with my invention.

The drawings illustrate my invention as used with what is known in the trade as a type A self-tapping screw. As illustrated in FIG. 3, this complementary screw includes the threads 20 having a width and pitch such that a cylindrical shank 21 is provided separating the adjacent convolutions of the threads. It will be apparent that other types of screws than that shown may be effectively used with the fastener of my invention. In this particular instance, however, by way of illustration, the root diameter of a No. 6 screw would be .100 inch and the height of the thread .020 inch, providing a maximum diameter from crest to crest of the thread of .140 inch.

As previously mentioned, the fastener or threadless nut portion is formed without the need of any notches or slits. As best shown in FIG. 4, this is accomplished by providing an oblong opening in the base which has a length or major dimension equal to the diameter of the screw from crest to root (in this instance .120 inch) and a width or minor dimension equal to the root diameter (.100 inch). This opening is without slits or notches and therefore the material is not weakened. This may be simply designed by forming the upper and lower parts of the opening as viewed in the figures of semicircular form and of a diameter substantially equal to that of the screw at the root, separated by a substantially straight mid portion of a length equal to the height of the thread.

The material of the base is formed to cause the edge of the material defining the opening, as viewed in FIG. 4, to incline backward, away from the surface adapted to complementarily mate with one workpart 14, at an angle substantially equal to the helix angle of the thread on the screw. Therefore, from the point A, on FIG. 4, to point B viewing the same in a clockwise direction, the material at the edge of the opening engages with the screw for 180° at the root of the thread. This is shown most clearly from FIG. 5. From the opposite point B, again proceeding in a clockwise direction, the material at the edge of the opening leaves the thread root and follows a line outwardly toward the crest of the adjacent thread, this being the thread that, due to the relation of the screw, is moving away from the back or exit side of the fastener or nut (see FIG. 6). This is due to the elongation of the hole. At the same time the metal at the edge of the hole, after a short space, in this instance approximately .020 inch, reverses its direction and inclines toward the mating surface of the body portion. At approximately 90° from the point B between that point C and D, it reaches the crest of the entering convolution of the screw and crosses over it. The crest of the preceding convolution is then engaged at the crossover point and the metal then rides down the side of the screw shank 21, in engagement therewith from point D to point A where it engages with the thread at the root. Obviously the opening should be slightly larger than the body of the screw at the roots of the threads in order to allow for a slight variation in size of such screws and therefore the point where the edge of the opening rides over the crest of the screw may vary. In some instances, it will be slightly less than 90° from point A and in other instances approximately 62° or some point in between. It is desirable for the half angle of the screw thread to be at least equal to the helix angle of the thread. In addition, the material forming the body portion preferably has a thickness less than the axial distance as measured from the crest of a thread 20 of the complementary screw member 12 to the juncture of the adjacent screw thread with the screw body or shank 21 to further afford sufficient clearance of said screw thread to permit the screw 12 to be threaded through the aperture 11.

The manner of deforming the base around the aperture may vary somewhat but may be accomplished by the same punch and die that makes the opening. The only requisite is that the edge of the metal defining the aperture be continuous and has an inclination the angle of which is the same as the helix angle of the screw that it is to engage. In effecting this, the metal in the base on the left side of the aperture, as viewed in the figures, preferably is not deformed from the plane of the body portion between points A and D' and the deflection in a backward direction from the point A to point B is such that the edge of the opening follows the helix angle of the thread. The part between B and B' may be straight but preferably partakes of a curvature best shown in FIG. 6. Then from the point B' to point D' the edge slants parallel to the opposite edge to its initial point in the plane of the body portion, or, in a direction opposite to the thread helix angle. Thus, the forming part of the punch and die may form a depression such as shown in FIG. 4 that could be spherical but preferably is oblate with the major and minor axes of the oblate depression and the aperture being similarly disposed. The major axes of the depression and the oval aperture being offset with respect to each other along the minor axis to position the aperture along said minor axis toward one side of the depression. An edge of the aperture is preferably tangent to the outline of the depression at a point on the minor axis and in the plane of the body with its opposite edge, defined by points B and B', being substantially at the point of greatest depth in the depression.

It should be pointed out that although the parts of the opening B to B' and D' to A may be straight, that actually, because of the small distance there may be some slight curvature.

Figure 2:
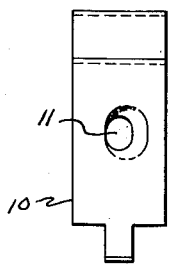
FIG. 2 is a front view of the fastener removed.

It will thus be apparent that the formation of the nut is such that it may be done by a very simple punch and die operation. This greatly simplifies the cost of the tools and requires only one operation of the tools to provide the desired conformation. The fact that there are no slits or slots also decreases the cost. This saving in cost is even greater when the invention is incorporated in a device such as FIGS. 1 and 2.

In addition, the elimination of the slits or slots also enables a larger range of thickness of metals to be used and there is no weakening of the metal but actually a strengthening because of the rearward bulging zone. At the same time metals of greater thickness can be used since there is no need to slit or slot the metal.

While there has been described herein and illustrated in the accompanying drawing a specific presently preferred embodiment of the present invention, it is to be understood that various modifications, omissions and refinements which depart from the disclosed embodiment may be adopted without departing from the spirit and scope of this invention.

I claim:
1. In combination with a threaded screw and parts to be secured thereby, a threadless fastener including a body portion having a flat mating surface adapted for close engagement with at least one of said parts and a thread engaging portion, said thread engaging portion having an oblong opening providing an uninterrupted margin for receiving the threaded shank of said screw, said opening having a major dimension substantially equal to the root to crest diameter of said complementary screw, said opening having a minor dimension substantially equal to the root to root diameter of said screw, said thread engaging portion located on a deflected part of said body portion in the vicinity of said opening, said deflection being in the direction away from said complementary mating surface and along said minor dimension, substantially one-half of the edge of said opening in the deflected body portion being inclined at an angle to the plane of the body from a point in the plane of the body to a diametrically opposite point, the remaining half of said edge being inclined from said opposite point to said point in the plane of the body, said angle being substantially equal to the helix angle of the thread of said screw, the half angle of the screw thread being at least equal to the helix angle.

2. In combination with a threaded screw and parts to be secured thereby, a threadless fastener including a body portion having a flat mating surface adapted for close engagement with at least one of said parts and a thread engaging portion, said thread engaging portion having an oblong opening providing an uninterrupted margin for receiving the threaded shank of said screw, said opening having a major dimension substantially equal to the root to crest diameter of said complementary screw, said opening having a minor dimension substantially equal to the root to root diameter of said screw, said thread engaging portion located on a deflected part of said body portion in the vicinity of said opening, said deflection being in the direction away from said complementary mating surface and along said minor dimension, substantially one-half of the edge of said opening in the deflected body portion being inclined at an angle to the plane of the body from a point in the plane of the body to a diametrically opposite point, the remaining half of said edge being inclined from said opposite point to said point in the plane of the body, said angle being substantially equal to the helix angle of the thread of said screw, said body portion having a thickness less than the axial distance as measured from the crest of a thread of the complementary screw member to the juncture of the adjacent screw thread with the screw body to afford sufficient clearance of said screw thread to permit the screw to be threaded through the thread engaging aperture.

3. A sheet metal nut capable of use with a complementary stud having either a left-hand or right-hand thread, said nut including a substantially planar body portion having an oblate depression formed in said body portion and deflected from said body in a direction away from a workpiece with which it would be ultimately associated, said oblate depression in said body portion having an oval aperture therein providing an uninterrupted margin of smaller dimension than said depression with the major and minor axes of the oblate depression and the aperture being similarly disposed, the major axes of the depression and the oval aperture being offset with respect to each other along the minor axis to position the aperture along said minor axis toward one side of the depression, the portion of the oblate depression in which said aperture is located having an inclination to said planar body along the minor axis of said depression and aperture to present half of the margin of the oval aperture on each side of the minor axes of the depression and aperture, with substantially one-half of the edge of said aperture in the inclined portion of the oblate depression being inclined at an angle to the plane of the body from a point in the plane of the body to a diametrically opposite point, the remaining half of said edge being inclined from said opposite point to said point in the plane of the body, said angle being substantially equal to the helix angle of the thread of the screw, said body portion having a thickness less than the axial distance as measured from the crest of a thread of the complementary screw member to the juncture of the adjacent screw thread with the screw body to afford sufficient clearance of said screw thread to permit the screw to be threaded through the thread engaging aperture.

References Cited in the file of this patent

UNITED STATES PATENTS

| | | |
|---|---|---|
| 1,273,439 | Woodward | July 23, 1918 |
| 1,749,903 | Cannon | Mar. 11, 1930 |
| 2,000,732 | Zelt | May 7, 1935 |
| 2,286,042 | Tinnerman | June 9, 1942 |
| 2,781,686 | Boyd | Feb. 19, 1957 |
| 2,859,984 | Thomas | Nov. 11, 1957 |

FOREIGN PATENTS

| | | |
|---|---|---|
| 101,523 | Austria | Nov. 10, 1925 |
| 685,965 | France | July 21, 1930 |